United States Patent Office 3,053,646
Patented Sept. 11, 1962

3,053,646
GRINDING AND POLISHING COMPOSITIONS
AND METHOD OF MAKING SAME
Harold H. Roth, Bay City, Mich., assignor to The Dow Chemical Company, Midland, Mich., a corporation of Delaware
No Drawing. Filed July 15, 1960, Ser. No. 43,007
8 Claims. (Cl. 51—298)

This invention relates to grinding and polishing operations, and more particularly to new and improved compositions useful for such purposes as well as a method for preparing said compositions.

United States Patent No. 2,783,137 describes grinding and polishing compositions comprising solid abrasive particles in a flowable medium of water, aliphatic polyhydric alcohols and mixtures thereof thickened with a small amount of an alkali salt of a sulphonated alkenyl aromatic resin. These compositions, although highly desirable in most instances, possess a certain limitation. The limitation centers about the fact that occasionally flocculation of the solid, abrasive suspended-matter occurs thus making storage of such compositions in excess of about twenty-four hours not practicable. When flocculation does occur in this manner, it is necessary to curtail grinding operations to re-suspend the abrasive particles in the flowable medium.

My investigations revealed that this flocculative action arises from the fact that minor portions (usually less than about 5 percent by weight) of the sulphonated alkenyl aromatic resins are water-soluble rather than being water-swellable. Water-solubility results from the facts that commercial reaction conditions sometimes cause incomplete cross-linking or excessive sulphonation of the alkenyl aromatic resin. Of course, the relatively small water-soluble portion may be separated from the bulk of the resin-product by leaching operations and the like; however, such separation techniques require additional equipment, time and expense which are unnecessary for the major portion of the resin-product as well as uses for such resin-product excepting the grinding and polishing operations.

I have discovered that the flocculative or anti-dispersive action experienced with the minor portions of water-soluble alkenyl aromatic resins may be obviated by the concomitant admixture of cellulosic ether compounds. Admixture of such cellulosic ether compounds may occur at any time during formulation of the grinding compositions; however, terminal admixture provides an efficient method. Generally, when the amount of the water-soluble fraction of alkenyl aromatic resin is less than about 5 percent, the preferred ratio of water-soluble alkenyl aromatic resin to cellulosic ether is from about 1:1 to about 1:5 by weight. Any cellulosic ether such as methyl cellulose, hydroxyethyl cellulose, hydroxypropyl methyl cellulose, carboxymethyl cellulose and the like including combinations thereof may be utilized.

The sulphonated alkenyl aromatic resins employed as ingredients of the compositions are obtained by the nuclear sulphonation of solid polymers and copolymers of monoalkenyl aromatic hydrocarbons having the general formula:

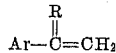

wherein Ar represents an aryl radical and R represents hydrogen or a methyl radical. Examples of such alkenyl aromatic resins are polystyrene, solid polymers of vinyltoluene, vinylxylene, ar-ethylstyrene, alpha-methylstyrene, or ar-methyl-alpha-methylstyrene, etc., and solid copolymers of such alkenyl aromatic compounds with one another, e.g. copolymers of styrene and alpha-methylstyrene, or of styrene and vinyltoluene, etc. Although any such solid, resinous polymer or copolymer may be sulphonated for use in the compositions of the invention, the polymers and copolymers which, when dissolved in nine times their weight of toluene, form solutions having viscosities of from 400 to 4,000 centipoises at 25° C. are most satisfactory. Polystyrene and polyvinyltoluene are preferably employed.

The alkenyl aromatic resin is sulphonated in known manner, e.g. using a sulphonating agent such as concentrated or fuming sulphuric acid, chlorosulphonic acid, or sulphur trioxide, etc. The mixture is then neutralized by treatment with an alkali such as sodium hydroxide, potassium hydroxide, sodium carbonate, potassium carbonate, sodium bicarbonate, potassium bicarbonate, or ammonia, etc. The resultant alkenyl aromatic resin sulphonate is separated, preferably in dry form. Procedures for carrying out these operations are widely known in the art.

The substantial portion of alkenyl aromatic resin sulphonates thus prepared have a property, when added to water or liquid aliphatic polyhydric alcohols, of swelling to a substantially uniform gel with resultant increase in viscosity. The extent to which the viscosity of water or a polyhydric alcohol is increased by addition of such resin sulphonate is dependent upon a number of factors such as the kind of liquid employed, the kind and molecular weight of the alkenyl aromatic resin from which the sulphonate was prepared, the extent of sulphonation of such resin, and the proportion of sulphonated resin added to the liquid. Thickening becomes greater as the proportion of an added resin sulphonate is increased. For the purpose of this invention, an alkenyl aromatic resin sulphonate is added to the water, or aliphatic polyhydric alcohol, in a proportion such that the thickened liquid has a viscosity of from 1,000 to 50,000, preferably from 5,000 to 40,000 centipoises at 25° C.

Examples of aliphatic polyhydric alcohols which may be thickened with alkenyl aromatic resin sulphonates and be employed in the compositions of the inventions are ethylene glycol, propylene glycol, butylene glycol, glycerine, diethylene glycol and dipropylene glycol, etc. Apparently, any liquid saturated aliphatic polyhydric alcohol may be used in the compositions, but those containing not more than six carbon atoms and having an average of three or less carbon atoms per hydroxyl group in the molecule are preferred.

An abrasive material, in the form of fine grains or particles, is added to the liquid thus thickened with the alkenyl aromatic resin sulphonate and the mixture is stirred to form a suspension of the abrasive particles in the liquid. Any of the usual abrasives, such as silicon carbide, aluminum oxide, silicon dioxide, ferric oxide, or powdered glass, etc., may be used in the composition.

The proportion of abrasive material added in forming the composition may be varied widely, e.g. from that forming a mobile, or flowable, composition to that forming a fairly stiff, non-flowable paste. The composition should contain sufficient liquid to serve as a medium in which the abrasive particles are suspended. In most instances, the abrasive is added in amount corresponding to from 0.5 to 50, preferably from 15 to 30 percent of the weight of the composition, but it may be employed in smaller or larger proportions.

The following examples describe the effect derived from utilizing cellulosic ether compounds concomitantly with suphonated alkenyl aromatic resins having small portions of water-soluble suphonated resinous material contained therein; it should be understood that the examples are provided to illustrate and not to limit the present invention.

Example 1

Approximately 2 parts by weight of an ammonium salt of suphonated polyvinyltoluene, containing about a 4 percent water-soluble fraction, were admixed with 98 parts of water to form a substantially uniform, viscous liquid medium having a viscosity of 8,000 centipoises at 25° C. Approximately 40 parts by weight of aluminum oxide in the form of particles of 120 to 200 mesh size, and 10 parts polyethylene glycol were added to the viscous liquid medium, stirred to form a suspension of the particles in the thickened liquid, and separated into two aliquot portions. Thereafter, methyl cellulose, amounting to four times the weight of the water-soluble fraction of sulphonated polyvinyltoluene, was introduced into one of the aliquot portions. The two aliquot portions were then allowed to stand for periods in excess of three weeks; the aluminum oxide particles did not settle upon standing in the portion containing methyl cellulose, whereas following 24 hours standing, aluminum oxide particles did gravitate to the bottom of the flask containing the portion untreated by methyl cellulose.

Example 2

In a manner identical to the foregoing Example 1, two aliquot portions of the grinding composition were prepared whereby one of said portions had hydroxyethyl cellulose, amounting to two times by weight the amount of water-soluble sulphonated polyvinyltoluene, admixed therein. Upon standing, the portion without the hydroxyethyl cellulose additaments experienced particle settling after about 24 hours, whereas the portion containing hydroxyethyl cellulose evidenced no anti-dispersive effect after about three weeks standing.

All of the solutions discussed in the foregoing Examples 1 and 2 were applied in both hand and high speed motor grinding operations of glass and metallic substances; satisfactory results were obtained in all instances with no impairment noted due to the cellulose ether addition. However to utilize the solutions not containing cellulose ether, it was necessary to re-suspend the aluminum oxide particles before proceeding with the grinding operations, whereas such action was not necessary in those instances when cellulose ether was utilized.

Other cellulosic materials, such as carboxymethyl cellulose, and hydroxypropyl cellulose, hydroxypropyl methyl cellulose and the like as well as combinations thereof may be utilized in a manner similar to the foregoing with substantially identical results obtained.

Various modifications may be made in the present invention, but it is to be understood that I limit myself only as defined in the appended claims.

I claim:

1. A grinding and polishing composition comprising a suspension of solid abrasive particles in a flowable medium consisting essentially of a liquid selected from the group consisting of water, aliphatic polyhydric alcohols and mixtures thereof; thickened with (1) a small amount of an alkali metal salt of a water-swellable, sulphonated alkenyl aromatic resin in which there is present a minor proportion of an anti-dispersive, water-soluble sulphonated alkenyl aromatic resin and (2) a sufficient amount of a cellulose ether selected from the group consisting of methyl cellulose, hydroxyethyl cellulose, hydroxypropylmethyl cellulose, carboxymethyl cellulose ethers dispersible in the system, whereby the solid abrasive particles are caused to remain suspended for an extended period of time.

2. A composition as in claim 1 wherein the alkali metal salt of a sulphonated alkenyl aromatic resin is an alkali metal salt of a sulphonated polyvinyltoluene.

3. A composition as in claim 1 wherein the cellulose ether is methyl cellulose ether.

4. A composition as in claim 1 wherein the cellulose ether is hydroxyethyl cellulose ether.

5. In a method for the preparation of a grinding and polishing composition which comprises mixing together (1) a liquid selected from the group consisting of water, aliphatic polyhydric alcohols and mixtures thereof, (2) a thickening amount of a water-soluble sulphonated alkenyl aromatic resin in which there is present a minor proportion of an anti-dispersive, water-soluble sulphonated alkenyl aromatic resin and (3) a solid abrasive material; the improvement which consists in admixing with the grinding and polishing composition a sufficient amount of a cellulose ether selected from the group consisting of methyl cellulose, hydroxyethyl cellulose, hydroxypropylmethyl cellulose, carboxymethyl cellulose ethers dispersible in the system, whereby the solid abrasive particles are caused to remain suspended for an extended period of time.

6. A method as in claim 5 wherein the alkali metal salt of sulphonated aromatic resin is an alkali metal salt of a sulphonated polyvinyltoluene.

7. A method as in claim 5 wherein the cellulose ether is methyl cellulose ether.

8. A method as in claim 5 wherein the cellulose ether is hydroxyethyl cellulose ether.

References Cited in the file of this patent

UNITED STATES PATENTS

| 2,783,137 | Roth | Feb. 26, 1957 |
| 2,893,854 | Rinker | July 7, 1959 |

FOREIGN PATENTS

| 142,978 | Australia | Aug. 17, 1951 |
| 559,943 | Great Britain | Mar. 13, 1944 |

OTHER REFERENCES

"The New Methocel," Dow Chemical Co., 1949, pages 6–8.